US012395850B2

(12) United States Patent
Vitiello et al.

(10) Patent No.: US 12,395,850 B2
(45) Date of Patent: Aug. 19, 2025

(54) LAWFUL INTERCEPTION IN NETWORK SLICES

(71) Applicant: Telefonaktiebolaget LM Ericsson (PUBL), Stockholm (SE)

(72) Inventors: Antonio Vitiello, Pompei (IT); Biagio Maione, Naples (IT); Dario De Vito, Mercato San Severino (IT); Gino Ciccone, Aprilia (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 200 days.

(21) Appl. No.: 18/248,901

(22) PCT Filed: Oct. 15, 2020

(86) PCT No.: PCT/EP2020/079018
§ 371 (c)(1),
(2) Date: Apr. 13, 2023

(87) PCT Pub. No.: WO2022/078603
PCT Pub. Date: Apr. 21, 2022

(65) Prior Publication Data
US 2023/0422042 A1 Dec. 28, 2023

(51) Int. Cl.
*H04W 12/80* (2021.01)
(52) U.S. Cl.
CPC .................. *H04W 12/80* (2021.01)
(58) Field of Classification Search
CPC ... H04W 12/10; H04W 12/121; H04W 12/30; H04W 12/37; H04W 12/80
See application file for complete search history.

(56) References Cited

U.S. PATENT DOCUMENTS

| 10,742,396 | B2* | 8/2020 | Suthar | H04M 15/8038 |
| 10,743,217 | B2* | 8/2020 | Lohar | H04W 36/0061 |
| 11,178,602 | B2* | 11/2021 | Roeland | H04W 12/06 |
| 11,683,393 | B2* | 6/2023 | Li | H04L 67/59 |
| | | | | 709/202 |
| 2019/0380031 | A1* | 12/2019 | Suthar | H04W 60/00 |

(Continued)

OTHER PUBLICATIONS

ETSI GR NFV-SEC 011 V1.1.1 (Apr. 2018); Network Functions Virtualisation (NFV); Security; Report on NFV LI Architecture.

(Continued)

*Primary Examiner* — Hosuk Song
(74) *Attorney, Agent, or Firm* — Baker Botts L.L.P.

(57) ABSTRACT

A method for providing lawful interception, LI, in a radio communication system (500) with network slices, NSs, (520, 530, 540). The method comprises: providing a broker LI provisioning function, bLIPF (508) connected to an LI centralized function, LICF, (506), and to at least one slice LI provisioning function, sLIPF, (528, 538, 548) implemented on one of the NSs; receiving an LI target identity, if the LICF determines that a party of a network service provided using a network function, NF, (522, 524, 526, 532, 534, 536, 542, 544, 546) running on the one of the NSs has the LI target identity; and conveying the LI target identity from the bLIPF to the at least one sLIPF, wherein the at least one sLIPF activates a point of interception, POI, (522p, 524p, 526p, 532p, 534p, 536p, 542p, 544p, 546p) associated with or embedded in the NF to intercept data.

15 Claims, 15 Drawing Sheets

(56) References Cited

U.S. PATENT DOCUMENTS

2020/0404069 A1* 12/2020 Li ........................ H04L 67/59
2021/0289432 A1*  9/2021 Roeland ............... H04W 48/18
2023/0379516 A1* 11/2023 Kwon ................. H04L 65/611

OTHER PUBLICATIONS

3GPP TS 23.501 V16.5.0 (Jul. 2020) 3rd Generation Partnership Project; Technical Specification Group Services and System Aspects; System architecture for the 5G System (5GS); Stage 2 (Release 16).
3GPP TS 28.530 V16.2.0 (Jul. 2020); 3rd Generation Partnership Project; Technical Specification Group Services and System Aspects; Management and orchestration; Concepts, use cases and requirements (Release 16).
3GPP TS 33.127 V16.3.0 (Mar. 2020); 3rd Generation Partnership Project; Technical Specification Group Services and System Aspects; Security; Lawful Interception (LI) architecture and functions (Release 16) [due to size, this reference has been split into two parts].
GSM Association, Official Document NG. 116—Generic Network Slice Template; Generic Network Slice Template Version 2.0; Oct. 16, 2019.
GSMA, An Introduction to Network Slicing—2017.
Krzysztof Kozlowski et al., 2018 9th International Conference on the Network of the Future (NOF) "Open Issues in Network Slicing".
PCT International Search Report issued for International application No. PCT/EP2020/079018—Jun. 25, 2021.
PCT Written Opinion of the International Searching Authority issued for PCT/EP2020/079018—Jun. 25, 2021.
Lawful Interception in 5G Networks v.23; Contribution: #s3i170113; 3GPP SA3-LI Meeting, Palm Beach, Florida; Apr. 25-28, 2017.

* cited by examiner

LAWFUL INTERCEPTION IN NETWORK SLICES

PRIORITY

This nonprovisional application is a U.S. National Stage Filing under 35 U.S.C. § 371 of International Patent Application Serial No. PCT/EP2020/079018 filed Oct. 15, 2020 and entitled "LAWFUL INTERCEPTION IN NETWORK SLICES" which is hereby incorporated by reference in its entirety.

TECHNICAL FIELD

The invention generally relates to lawful interception (LI) in a radio communication system with network slices. Methods, a radio communication system, network devices, computer readable recording medium and a computer program are provided.

BACKGROUND

Network slices are independent logical networks, that is, end-to-end series of network elements interconnected to deliver a network application/service at a predetermined service quality (e.g., ultra-high-bandwidth communication, real-time traffic, etc.). A network slice (NS) may include a terminal, an access network, a core network, a transport network, etc., that may pertain to multiple network operators. Here, a network operator is a company (such as a wireless service provider, a wireless carrier, or a cellular company) that owns or controls hardware used for providing network services to its subscribers. In this document the term "radio communication system" represents hardware and software cooperatively interconnected to provide network services.

Each NS has dedicated resources and operates separately from other network slices. In 5G (i.e., fifth generation technology standard for cellular networks), resources and topology are optimized to serve a purpose, deliver a service or respond to particular customer demands (i.e., may be created "on demand"). Network slicing allows the implementation of tailor-made functionality meeting specific requirements.

NSs are parallel, virtualized and mutually isolated although they may share a common distributed cloud infrastructure. In other words, each NS is a separate logical network that provides specific network capabilities and network characteristics and has its own associated resources (e.g., computing, storage and networking resources). The creation of a slice (also called "deployment") can be triggered by a network provider, third parties (tenants), and, in some cases, also by network subscribers.

NS management encompasses four phases as illustrated in FIG. 1 (which is similar to FIG. 4.3.1.1. of 3GPP TS 28.530 entitled "Aspects; Management and Orchestration; Concepts, use cases and requirements," release 16.2.0 (2020 July)): preparation 110, commissioning 120, operation 130 and decommissioning 140. Preparation 110 includes an NS's design, on-boarding, evaluation of the NS's requirements, preparing the network environment and other necessary preparations completed before an NS instance (NSI) is deployed. Commissioning 120 includes NSI creation/deployment (with allocation of resources and implementation of required functionality) and customization for standard functions. Operation 130 includes activation, supervision, performance monitoring and capacity planning/modification. Finally, decommissioning 140 includes removal of the NSI's resources and functions, and NSI termination.

The information describing an NSI (which information is used in the preparation phase) may include resource model information, management model information and capability model information. The resource model information describes an NS's static parameters and functional components, and includes a service profile, an NS type (e.g., enhanced mobile broadband, eMBB, ultra-reliable low latency communications, URLLC, and massive machine type communications, mMTC), additional system features (e.g., multicast, edge computing), and priority. The management model information describes the information model used for the NS's lifecycle management and includes a configuration profile (e.g., application configuration parameters). The capability model information describes the NS's capabilities, including supported communication service characteristic information (e.g., service type, UE mobility level, density of users, traffic density), QoS attributes (e.g., bandwidth, latency, throughput and so on) and capacity (e.g., maximum number of UEs). This information can be exposed to a service recipient via a communication service management function.

The above-discussed NS information has been codified into a standardized list of attributes made public in Official Document NG. 116 entitled "Generic Network Slice Template," Version 2.0 made public by GSMA in October 2019. As defined in section 2.2. of this document, a generic NS template (GST) is a set of attributes characterizing a type of NS. GST is generic (i.e., not tied to any specific network deployment), but an NS type (NEST) is a GST in which the attributes have associated values determined based on specific requirements inferred from a use case (e.g., a network application/function to be executed using the NS).

FIG. 2 (which corresponds to FIG. 2 in Official Document NG. 116) illustrates GST and NEST in the context of an NS lifecycle. An NS customer (NSC) 210 sets forth requirements 230 for a specific network service use scenario 220. An NS provider (NSP) then maps the service requirements 230 into attributes of the GST 240 with appropriate values, generating NEST 250 at 260. One or more NSIs can be created using the same NEST, and already deployed (i.e., existing) NSI(s) may also be reused. Thus, NSIs (often called simpler "network slices") are deployed by an NSP according to a NEST to meet requirements for a use case specified by an NSC.

Network operators have legal obligations to allow lawful interception. Lawful interception, LI, is a process performed parallel with a network application if a network user (subscriber), which is a party in the application, is an LI target. The LI process selectively forwards information (such as interception-related information, IRI, and communication content, CC) intercepted from the network application to a law enforcement agency, LEA, with legal authorization (evidenced by a warrant that specifies the LI target) to acquire such information. A public official (e.g., a judge) authorizes the party's investigation, thereby, allowing lawful interception of his/her communications. The authorization paper, known as a "warrant", which is provided to the LEA, is converted to digital form identifying an LI target (i.e., the party) and the extent of interception (e.g., IRI, CC).

Network slicing makes implementation of LI more challenging than in conventional networks due to NSs' separation (i.e., isolation and independence from one another). Each NS may need its own mechanism (interfaces, functions and encryption) for LI of data or voice intercepted from a network application run using a network function (NF) on the NS. Such a mechanism adds undesirable complexity (draining resources, diluting the NS's independence or creating bottlenecks) to the overall architecture and has been so far an unresolved issue.

For example, FIG. 3 illustrates a conventional LI implementation in a radio communication system with NSs. Radio communication system 300 provides network services to subscribers 301-304 via network functions (NFs) 322, 324, 326, 332, 334, 336, 342, 344 and 346 executed on NSs 320, 330 or 340. The service level agreements of the users (network subscribers) and the specific service's requirements determine the service level (i.e., priority, type or traffic, etc.) at which the service is delivered. Thus, NSs are designed to ensure that the network services are provided at predetermined service levels. Here, the attribute "predetermined" indicates that the service level is set and known for a deployed (i.e., existing) NS.

Points of interceptions (POIs) 322p, 324p, 326p, 332p, 334p, 336p, 342p, 344p and 346p attached or embedded in the NFs are connected to mediation and delivery function (MDF) 350 located outside the slices via interfaces 322i, 324i, 326i, 332i, 334i, 336i, 342i, 344i and 346i, respectively. If a party to the network service provided using an NF on an NS is indicated as being an LI target, the POI attached or embedded in the NF intercepts LI data (i.e., at least IRI and sometimes also CC if thus specified in the warrant) from the NF and forwards the LI data to MDF 350. MDF 350 then reformats and delivers the LI data to a law enforcement monitoring function, LEMF, 360.

LEA device 362 indicates LEA targets to LI administration function (ADMF) 305, which includes an LI control function, LICF, 306 and an LI provision function, LIPF 307. LICF 306 maintains a centralized LI target list and prompts LIPF 307 to indicate LI target(s) named in a warrant to the appropriate POI (i.e., 322p, 324p, 326p, 332p, 334p, 336p, 342p, 344p or 346p) via a respective interface 322j, 324j, 326j, 332j, 334j, 336j, 342j, 344j or 346j. Some functions (e.g., AMF 312, NSSF 314 and NRF 316) illustrated in FIG. 3, which are common to all slices and usable by different users, are not described in detail here in order to maintain focus on the relevant aspects, but their description can be found, for example, in 3GPP TS 33.127 entitled "System Architecture for the 5G System," version 16.5.0 (2020 July).

The multiple LI-related interfaces of each NS (e.g., from LIPF to each POI/NF, and from each POI/NF to MDF) are a security risk, and difficult to handle by outside functions (e.g., LIPF 307, MDF 350), particularly, when LI data is encrypted and reflects different types of traffic for the different applications (NFs). As network slicing remains under development for resolving coherently and satisfactorily all carrier-grade requirements (such as interoperability, scalability, controllable performance, security, accounting, etc.), it is desirable to address the above-identified LI implementation issues for network applications and services provided using NSs.

SUMMARY

An object of the invention is to enable network slice-related tools easing lawful interception and/or lowering the number of LI-related interfaces to/from a network slice.

According to an embodiment, there is a method for providing LI in a radio communication system with network slices. The method includes providing a broker lawful interception provisioning function, bLIPF connected to a lawful interception centralized function, LICF, and to at least one slice lawful interception provisioning function, sLIPF, implemented on one of the NSs. The method further includes receiving from the LICF, by the bLIPF, an LI target identity according to a warrant, if the LICF determines that a party of a network service provided using a network function, NF, running on the one of the NSs has the LI target identity, and conveying the LI target identity from the bLIPF to the at least one sLIPF. The at least one sLIPF activates a point of interception, POI, associated with or embedded in the NF to intercept data that is to be delivered outside the one of the NSs.

According to another embodiment there is a method of providing LI ability in a radio communication system. The method includes providing NSs configured to deliver network services by executing NFs, at least one of the NSs being also configured to execute an sLIPF. The method further includes activating one or more POIs associated with or embedded in one or more of the NFs to intercepts data, upon receiving target identity information of the LI target by the sLIPF.

According to yet another embodiment, there is a radio communication system including NSs and at network device. At least one of the NSs is configured to execute an sLIPF. The network device is configured to maintain a list of NFs run of the NSs to provide network services, and, upon receiving an indication that a party to one of the network services provided using the NFs run on the at least one of the NSs is an LI target, to direct the sLIPF to activate a POI associated with or embedded in the NFs, to intercept data.

According to another embodiment there is a network device in a radio communication system with NSs having a network interface and a data processing unit that operate as a bLIPF: (1) to receive LI target information related to a network service provided using a NF implemented on one of the NSs, and (2) to forward the LI target identity information to an sLIPF on the one of the NSs, the sLIPF activating a POI associated with or embedded in the NF to intercept data.

According to yet another embodiment, there is a network device in a in a radio communication system with NSs. The network device has a receiver is configured to receive LI target information related to a network service provided using an NF implemented on one of the NSs. The network device also has a transmitter is configured to forward the LI target information to an sLIPF on the one of the NSs, the sLIPF activating a POI associated with or embedded in the NF to intercept data.

According to another embodiment there is a computer readable recording medium non-transitorily storing executable codes that when executed by a computer make the computer perform a method for providing LI in a radio communication system with NSs. The method includes providing a bLIPF connected to a LICF and to at least one sLIPF implemented on one of the NSs. The method further includes receiving from the LICF, by the bLIPF, an LI target identity according to a warrant, if the LICF determines that a party of a network service provided using an NF running on the one of the NSs has the LI target identity, and conveying the LI target identity from the bLIPF to the at least one sLIPF. The at least one sLIPF activates a POI associated with or embedded in the NF to intercept data that is to be delivered outside the one of the NSs.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
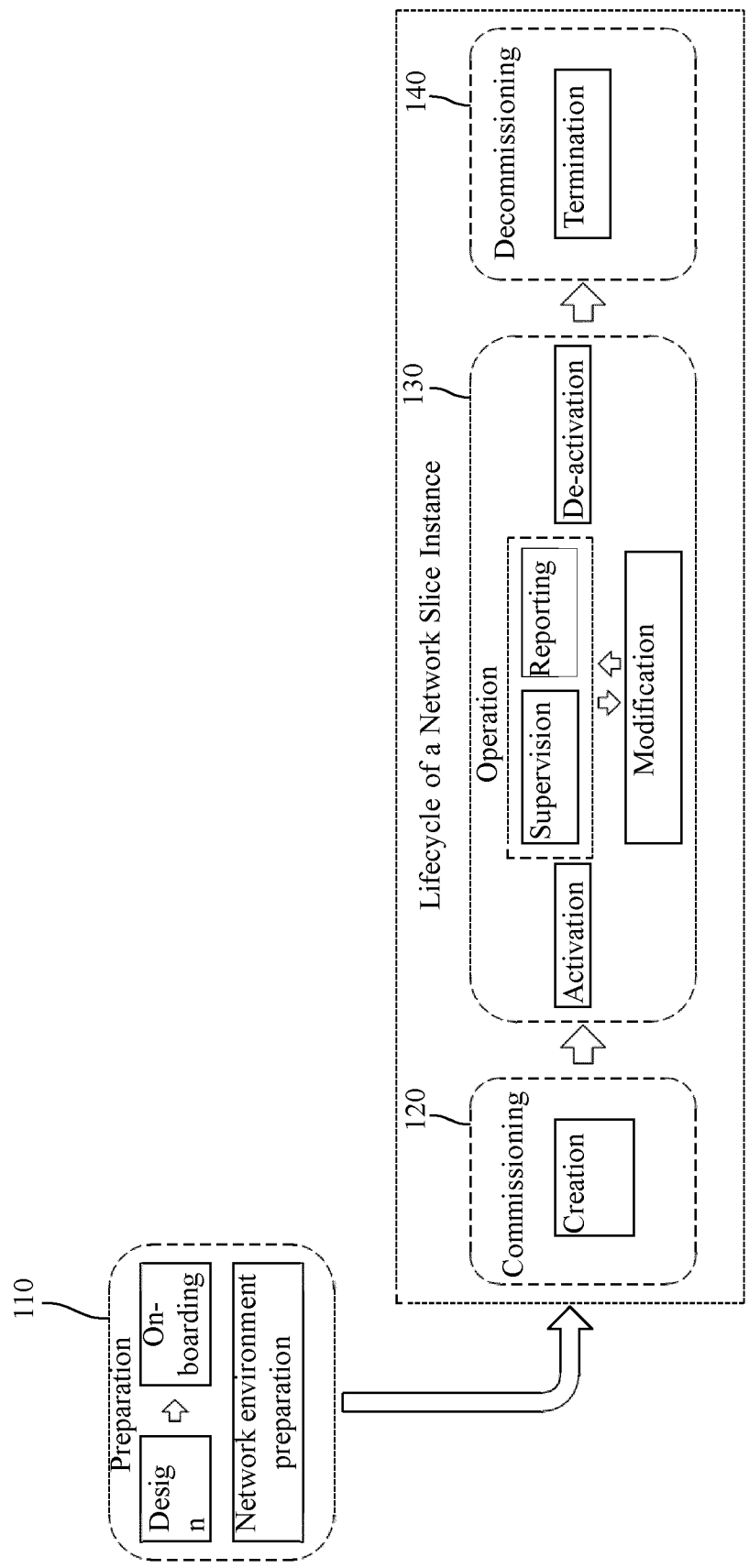
FIG. 1 illustrates management aspects of network slicing.
Figure 2:
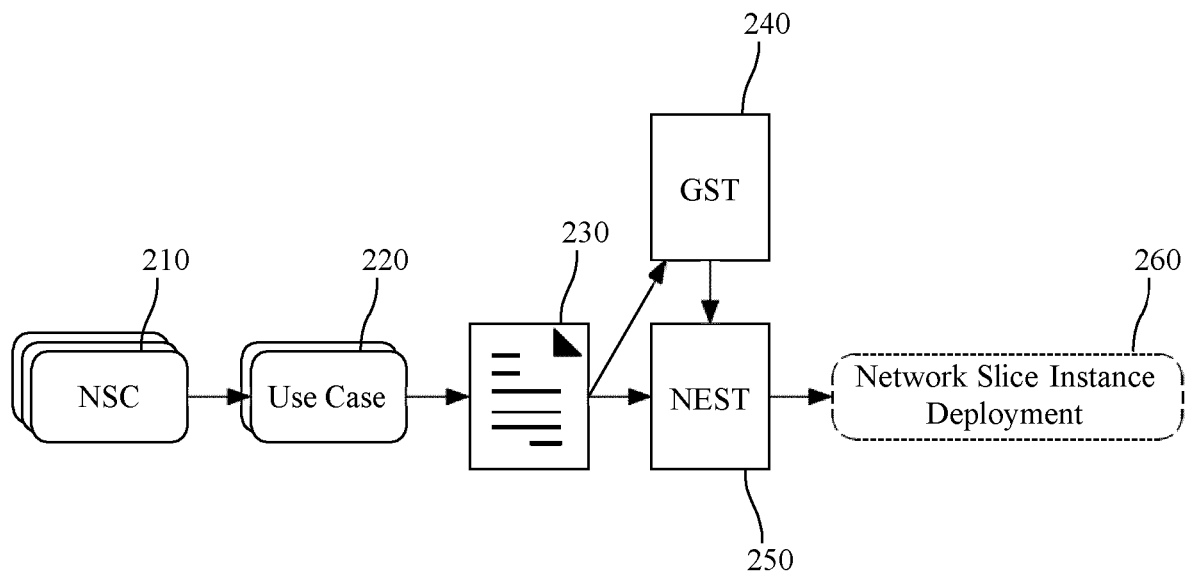
FIG. 2 illustrates GST and NEST in the context of an NS lifecycle.

The meanings of some abbreviations used in this document are explained below:
  ADMF Administration Function
  AMF Access and Mobility Management Function
  API Application Program Interface
  CC Communication Content
  eMBB Enhanced Mobile BroadBand
  GPSI Generic Public Subscription Identifier
  GSM "Groupe Speciale Mobile" (orig. French)
  GSMA GSM Association
  GST Generic Network Slice Template
  IMEI International Mobile Equipment Identity
  IMSI International Mobile Subscriber Identity
  IP Internet Protocol
  IRI Intercept Related Information
  KPI Key Performance Indicator
  LEA Law Enforcement Agency
  LEMF Law Enforcement Monitoring Function
  LI Lawful Interception
  LICF Lawful Interception Control Function
  LIPF Lawful Interception Provisioning Function
  LRPG Lawful Interception Routing Proxy Gateway
  MAC Media Access Control
  MANO Management and Orchestration
  MDF Mediation and Delivery Function
  mMTC massive Machine Type Communications
  MSISDN Mobile Subscriber Integrated Services Digital Network Number
  NAI Network Access Identifier
  NEST Network Slice Type
  NF Network Function
  NFV Network Functions Virtualization
  NRF Network Repository Function
  NS Network Slice
  NSC Network Slice Customer
  NSI Network Slice Instance
  NSP Network Slice Provider
  NSSF Network Slice Selection Function
  ORCH Orchestrator
  OSS/BSS Operations Support System/Business Support System
  PEI Permanent Equipment Identifier
  POI Point Of Interception
  QoS Quality of Service
  SIRF System Information Retrieval Function
  SUPI Subscription Permanent Identifier
  TF Triggering Function
  UE User Equipment
  VIM Virtual Infrastructure Manager
  VNF Virtual Network Function
  VNFM Virtual Network Functions Manager
  VNFCI Virtual Network Function Components
  VNFM Virtual Network Functions Manager
  URLLC Ultra Reliable Low Latency Communications.

The following description of the embodiments refers to the accompanying drawings. The same reference numbers in different drawings identify the same or similar elements. The following detailed description does not limit the invention. Instead, the scope of the invention is defined by the appended claims. Some of the embodiments are described in a 5G context, but such a context is not to be considered a limitation for the described approaches to LI implementation in radio communication systems supporting network slices. The network slices are end-to-end series of network elements (e.g., a terminal, an access network, a core network, a transport network, etc.) interconnected to deliver a network application/service at a predetermined service quality. The network elements in a network slice may be own by multiple different network operators (e.g., a wireless service provider, a wireless carrier, or a cellular company). A "radio communication system" means hardware and software cooperatively interconnected to provide network services.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Implementing LI functionality radio communication systems with NSs (i.e., for network applications that employ functions run on the NSs) is challenging due to the NSs' isolation. LI functionality requires numerous additional communications between NFs on an NS and devices/functions outside the NS. The embodiments described in this section focus on improving LI implementation, and on generating NSs able to support such enhanced LI implementations. In some embodiments the lawful interception provisioning function is split into a broker lawful interception provisioning function, bLIPF, and a lawful interception provisioning function on a network slice, sLIPF, thereby having a single interface between bLIPF and sLIPF to trigger LI for plural (all) network functions on the network slice. Some embodiments provide for deployment of network slices configured to execute sLIPF and, optionally, also a slice-based mediation and delivery function, sMDF.

Figure 4:
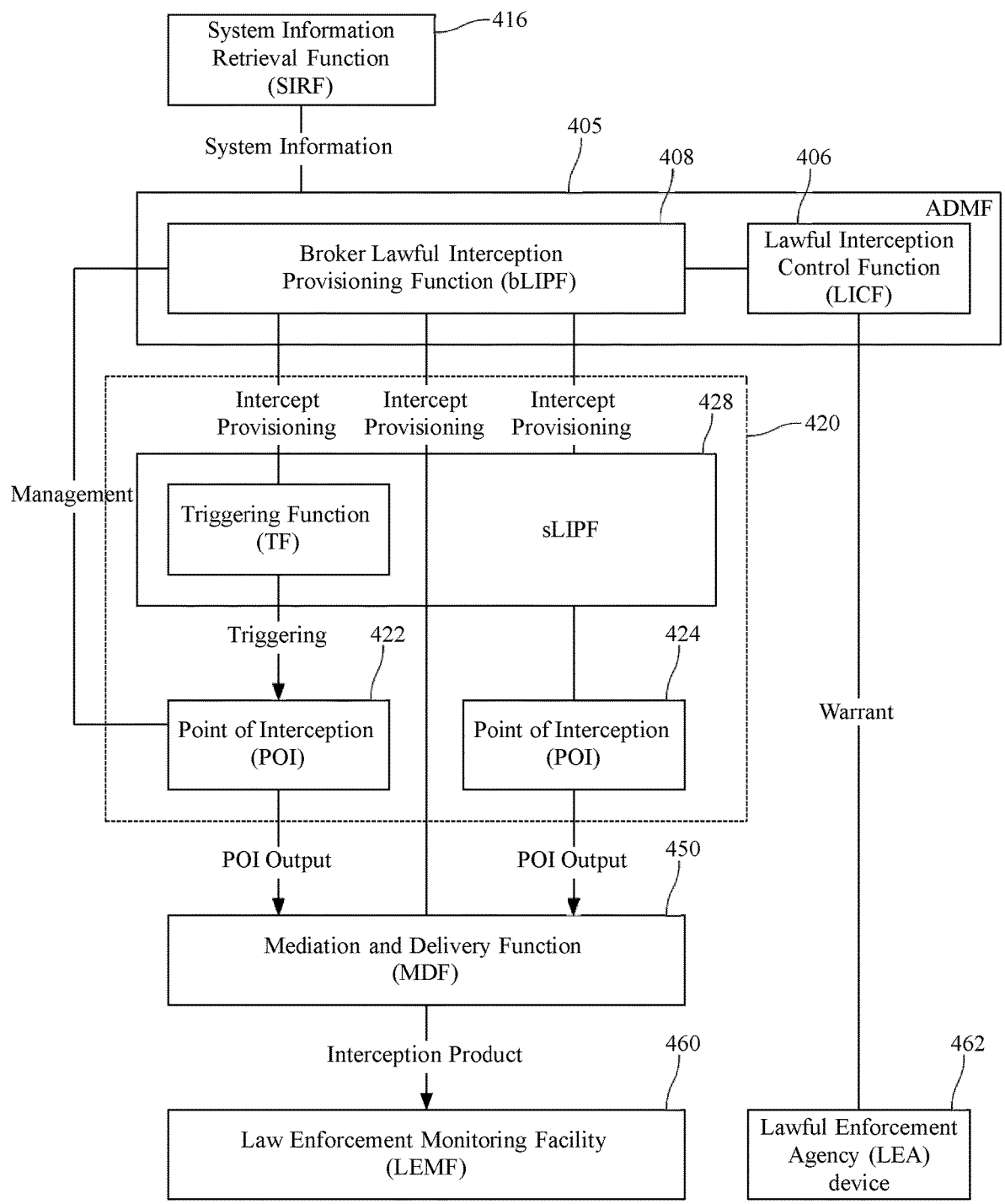
FIG. 4 illustrates an LI-focused architecture according to an embodiment.
Figure 5:
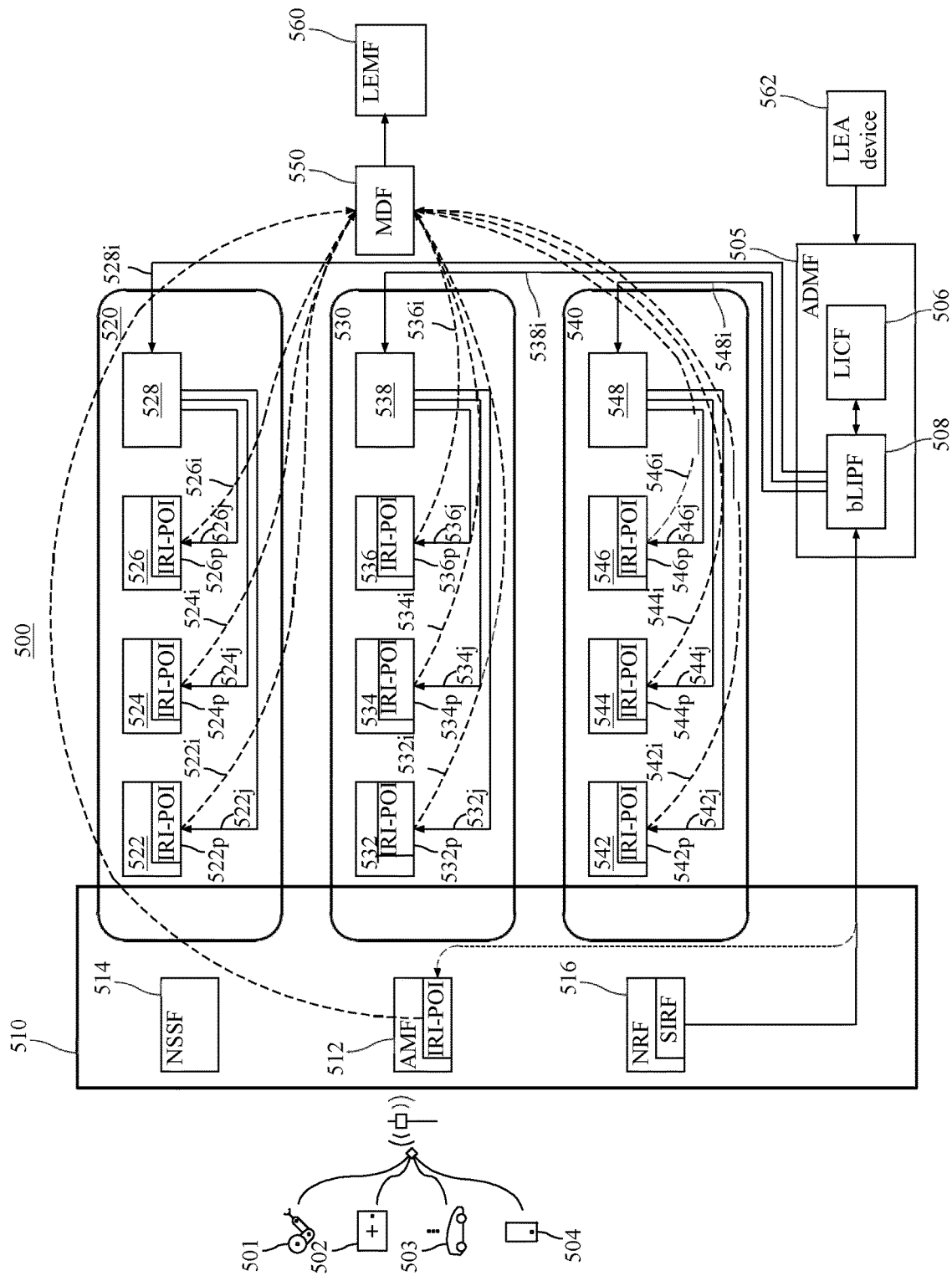
FIG. 5 illustrates a radio communication system with NSs configured for LI according to an embodiment.

Consider an LI-focused architecture 400 illustrated in FIG. 4 according to an embodiment (this figure is functionally similar to FIGS. 5.2-1 of 3GPP TS 33.127 v16.3.0 (2020 March), but the underlying hardware is differently organized). LEA 462 is responsible for submitting a warrant to an Administrative Function (ADMF) 405 of the cloud service provider. The ADMF has overall responsibility for provisioning, activating, modifying, de-provisioning and de-activating Point(s) Of Interception, POI(s), Triggering Function(s), TF(s), and Mediation and Delivery Function(s), MDF(s). Conventional ADMF includes two logical sub-functions: Lawful Interception Control Function, LICF, and Lawful Interception Provisioning Function, LIPF. In order to lower the number of interfaces between ADMF and the NSs, the conventional LIPF is now replaced by a broker lawful interception provisioning function, bLIPF, 408 connected to LICF 406 within ADMF 405, and slice lawful interception provisioning function sLIPF 428 implemented on the NS.

LICF 406 controls the lifecycle of LI activated by the warrant and stores a master record of sensitive LI information and configuration data. LICF 406 derives intercept information (e.g., identity of the party subject of LI, type of interception—IRI or CC) from the warrant. In LI, intercept related information (IRI, known also as "call data") consists of information about communications such as destination (e.g., called party's telephone number), source (e.g., caller's phone number), time of the communication, duration, etc. Call content (CC) is the stream of data exchanged by the communication participants. IRI and CC may be forwarded via different/distinct handover interfaces (e.g., standardized HI2 and HI3) but within this document they are considered to be a single multipotent interface able to forward both IRI and CC if required. For security reasons, communications between the network operator(s) and LEA may have an encrypted format and be transmitted over an IP-based VPN. The interception of traditional voice calls still often relies on the establishment of an ISDN channel that is set up at the time of the interception.

The intercept information is then provided to the appropriate POI and MDF. Except for the communication with LEA 462, all other communications between LICF 406 and network entities are proxied by bLIPF 408 and the sLIPF(s) as further discussed.

Broker LIPF (bLIPF) 408 provides the intercept information (e.g., LI target) to the pertinent POI (e.g., 422 or 424) on an NS 420 via sLIPF 428. If ADMF is required to take an active role in POI triggering, sLIPF 428 sends triggering information to the appropriate POI (e.g., POI 422) via a triggering function. For directly provisioned POI 424 and MDF 450, sLIPF 428 forwards LI administration instructions as received from LICF 406 via bLIPF 408, to the intended destination.

FIG. 5 illustrates a radio communication system 500 with NSs 520, 530 and 540 having sLIPFs 528, 538 and 548, respectively. If an NS is designed to provide a type of network service in which a party may be subject to LI, the NS may be configured with an sLIPF. Although all the NSs in FIG. 5 are configured to execute sLIPFs, it is not required for all NSs in a radio communication system to have this capability.

In 5G systems, the LI target may be identified by one or more of the following: 5G Subscription Permanent Identifier (SUPI), Permanent Equipment Identifier (PEI) and Generic Public Subscription Identifier (GPSI). Each of these codes or a combination thereof univocally identifies the network user. In particular, the SUPI contains the International Mobile Subscriber Identity (IMSI) or a network access identifier (NAI). The PEI contains the International Mobile Equipment Identity (IMEI) or a MAC address. The GPSI contains the MSISDN or an external identifier. 5G user identities are defined in the 3GPP TS 23.501 entitled "System Architecture for the 5G System" version 16.5.0 (2020 July).

Similar to system 300, on demand, radio communication system 500 may employ NFs 522, 524, 526, 532, 534, 536, 542, 544 and 546 on NSs 520, 530 and 540 to provide network services at predetermined service levels to network subscribers 501-504. The network services and/or the service levels may be different for different NSs.

Broker LIPF (bLIPF) 508 within ADMF 505 and sLIPFs 528, 538 and 548 perform the functionality of LIPF 307 in conventional system. NFs 522, 524, 526, 532, 534, 536, 542, 544 and 546 having attached or embedded POIs 522p, 524p, 526p, 532p, 534p, 536p, 542p, 544p and 546p, are connected to sLIPF 528, 538 or 548 on their NS 520, 530 or 540 via interfaces 522j, 524j, 526j, 532j, 534j, 536j, 542j, 544j, and 546j, respectively. Interfaces 528i, 538i and 548i connect sLIPF 528, 538 and 548 to bLIPF 508. Thus, in system 500, for each NS, there is a single interface related to the LIPF, instead of the plural (three) interfaces in the conventional system 300. Network system 500 may be a 5G system. Note that in system 500, there are still plural (three) interfaces related toward MDF for each NS.

Figure 3:
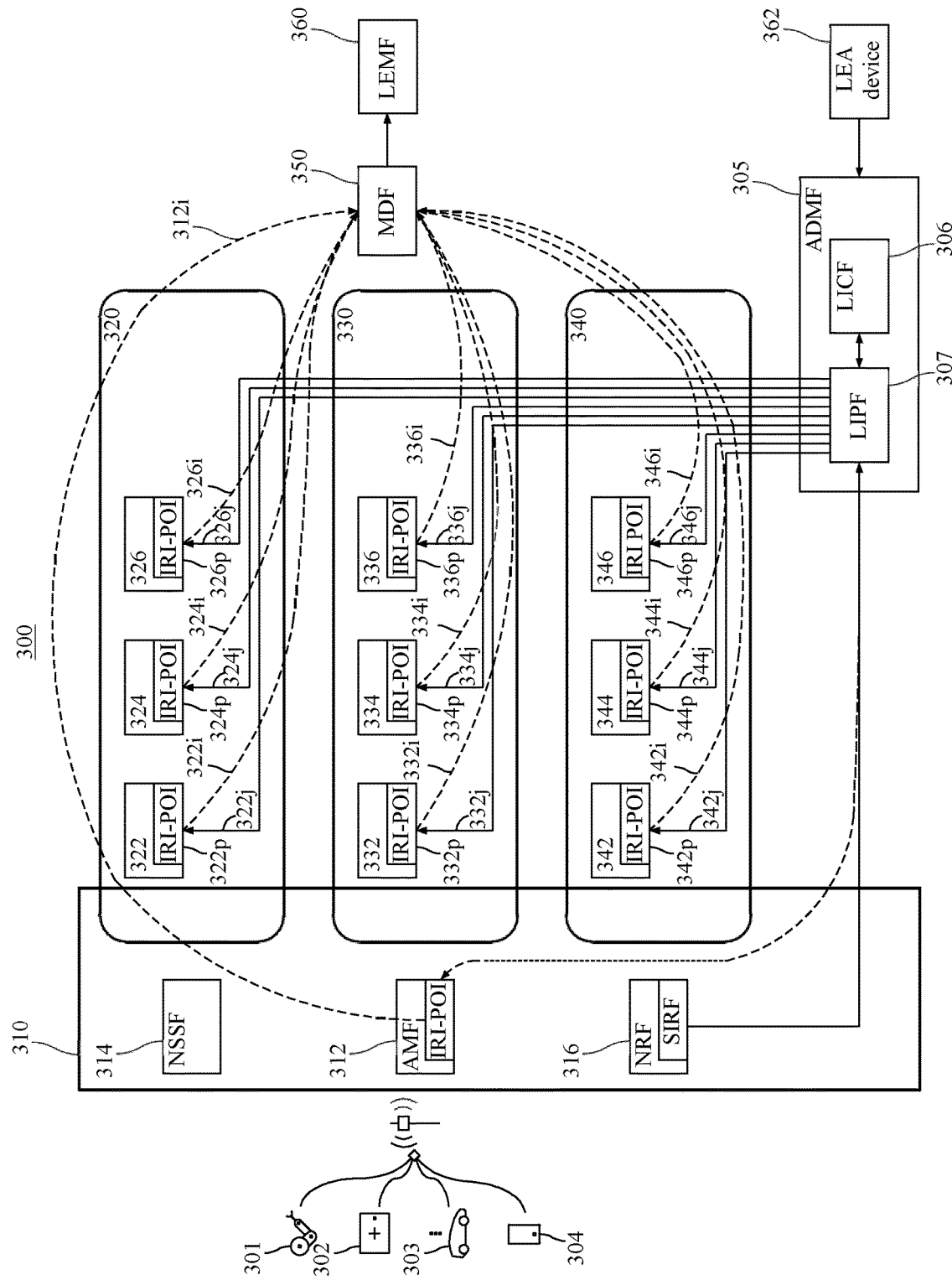
FIG. 3 illustrates a conventional LI implementation in a radio communication system with network slices.
Figure 6:
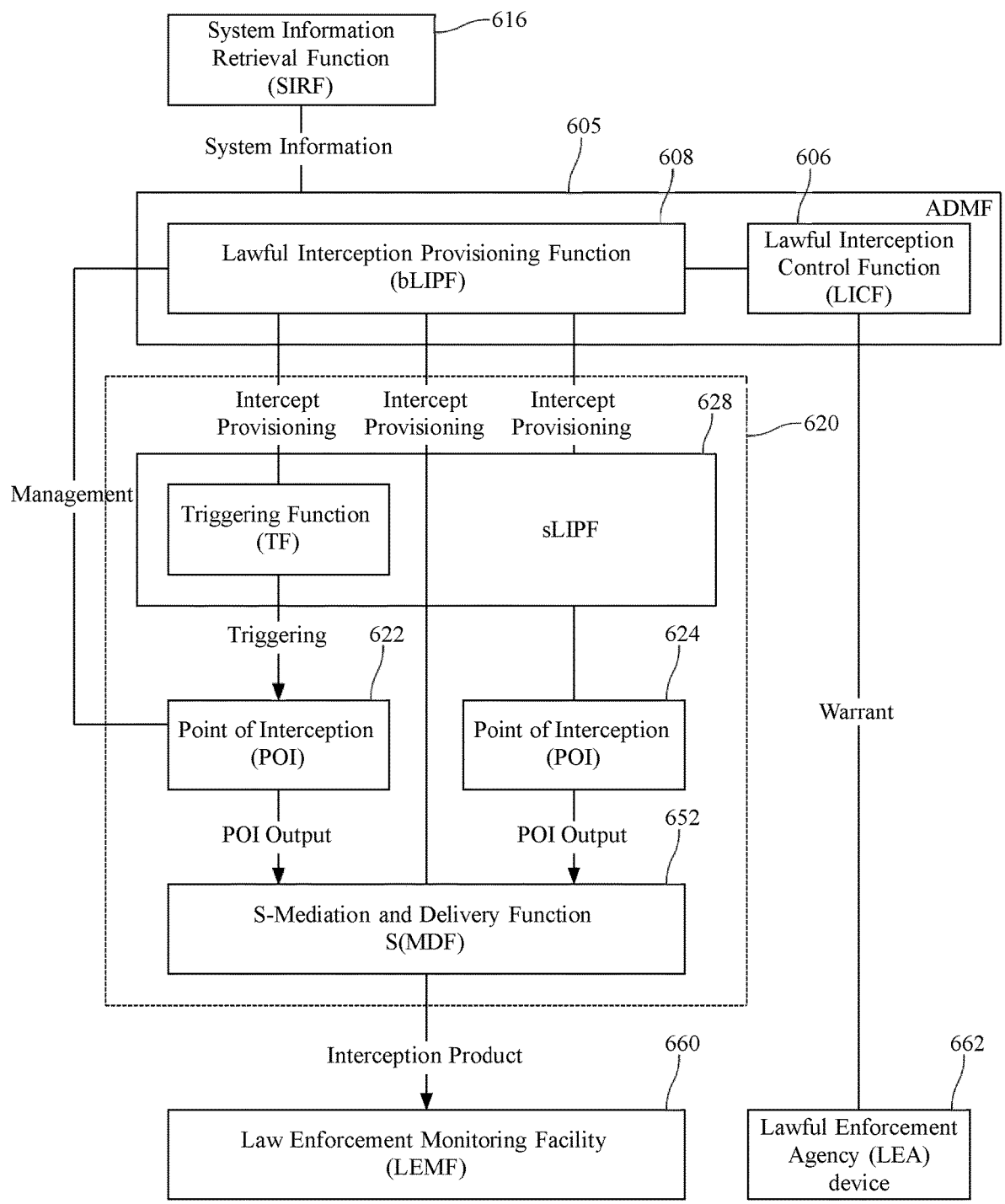
FIG. 6 illustrates an LI-focused architecture according to another embodiment.

Another LI-focused architecture 600 according to an embodiment is illustrated in FIG. 6. This embodiment is similar to the one illustrated in FIG. 4 except that unlike MDF 450, sMDF 652 is implemented inside NS 620. This approach further reduces the number of interfaces between the NS and network elements outside the NS, because a single interface is used to output LI data from the NS instead of one interface for each POI as it is for the systems illustrated in FIGS. 3, 4 and 5. Implementing LI with MDF on a network slice has been described by the same inventors in PCT/EP2020/072806 "Lawful Interception on Network Slices."

Figure 7:
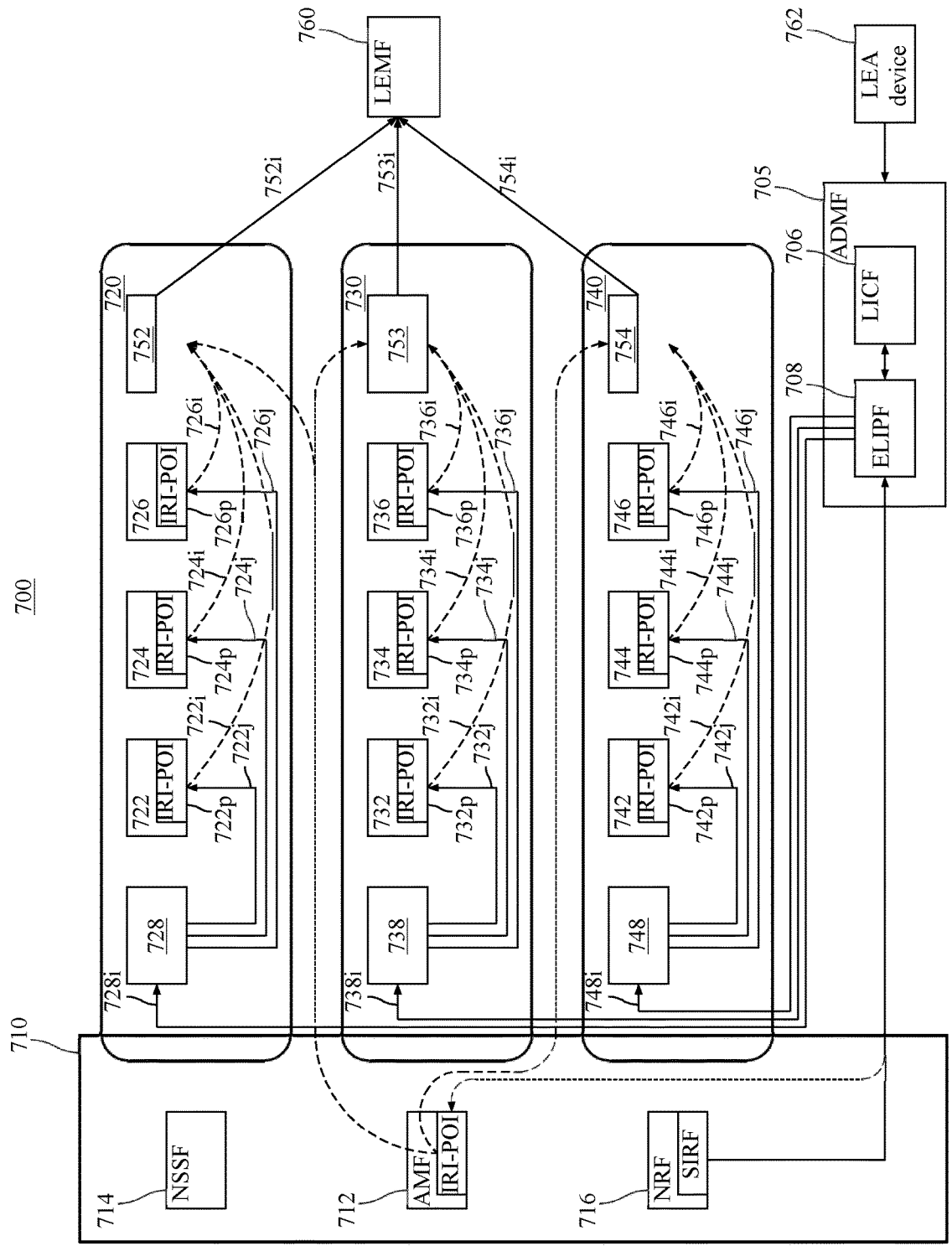
FIG. 7 illustrates a radio communication system with NSs configured for LI according to another embodiment.

FIG. 7 illustrates a radio communication system 700 with NSs 720, 730 and 740 configured to execute sLIPF 728, 738 and 748, respectively. Different from system 500, NSs of system 700 are also configured to execute slice mediation and delivery functions sMDFs 752, 753 and 754, respectively. The POIs 722p, 724p and 726p (which are associated with or embedded in NFs 722, 724 and 726 on NS 720) are linked to sLIPF 728 via interfaces 722j, 724j and 726j, and to sMDF 752 via interfaces 722i, 724i and 726i, respectively. NS 720 has only two LI-related interfaces with network elements outside the NS, that is, 728i between sLIPF 728 and bLIPF 708 and 752i between sMDF 752 and LEMF 760. Similar descriptions may be repeated for NS 730 and 740 in FIG. 7 but are omitted as labeling and arrangement is self-explanatory. Thus, the number of LI-related interfaces to/from the NSs 720, 730 and 740 is further reduced compared to system 500 because only one interface per network slice is used to output the LI data. Network system 700 may also be a 5G system.

Figure 8:
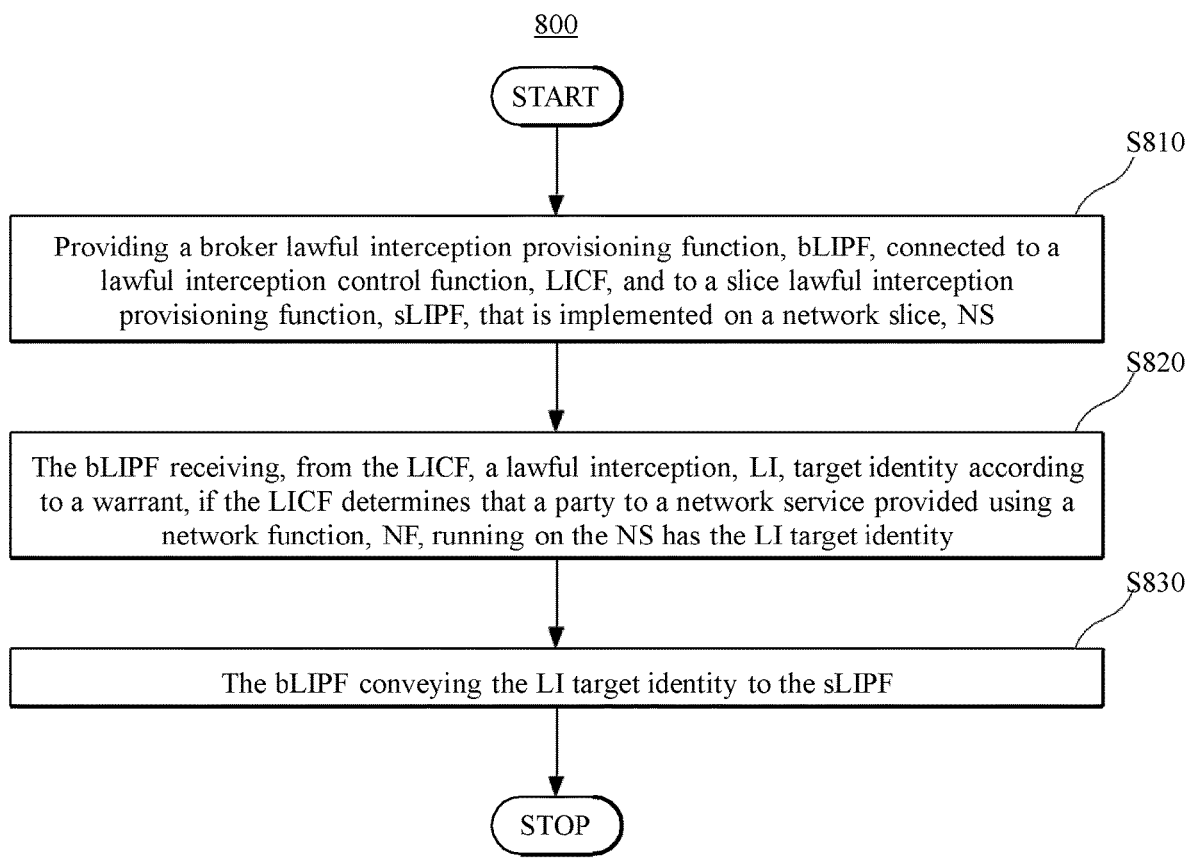
FIG. 8 is a flowchart of a method for providing LI in a radio communication system with NSs, according to an embodiment.

FIG. 8 is a flowchart of a method 800 for providing LI in a radio communication system (e.g., 400, 500, 600, 700) with NSs (e.g., 520, 530, 540, 720, 730, 740), according to an embodiment. Method 800 includes providing a broker lawful interception provisioning function, bLIPF, (e.g., 408, 508, 608, 708) connected to an LICF (e.g., 406, 506, 606, 706) and to a slice lawful interception provisioning function, sLIPF (e.g., 428, 528, 538, 548, 628, 728, 738 or 748) on an NS, at S810. Method 800 then includes receiving, from the LICF, by the bLIPF, an LI target identity according to a warrant, if the LICF determines that a party of a network service provided using a network function, NF, (e.g., 522, 524, 526, 532, 534, 536, 542, 544, 546, 722, 724, 726, 732, 734, 736, 742, 744, 746) running on the NS has the LI target identity at S820.

Method 800 further includes, at S830, conveying the LI target identity from the bLIPF to the sLIPF. The sLIPF then activates a POI (such as, 522*p*, 524*p*, 526*p*, 532*p*, 534*p*, 536*p*, 542*p*, 544*p*, 546*p*, 722*p*, 724*p*, 726*p*, 732*p*, 734*p*, 736*p*, 742*p*, 744*p*, 746*p*) associated with or embedded in the NF to intercept data to be delivered outside the NS.

The LICF may also transmit an interception type (i.e., IRI or CC) according to the warrant, to the bLIPF, and the bLIPF then conveys the interception type to the sLIPF. If the NS is also used to provide a second network service to the party, via a second network function, then the sLIPF may also activate a second point of interception associated with or embedded in the second network function to intercept the LI data.

In one embodiment, the method may further include (1) receiving (from the LICF, by the bLIPF) a second LI target identity according to a second warrant, if the LICF determines that a second party of a second network service provided using a second network function, running on the NS has the second LI target identity, and (2) conveying the second LI target identity from the bLIPF to the sLIPF. The sLIPF then activates another POI associated with or embedded in the second NF to intercept the LI data.

The NS being configured to execute the sLIPF may be determined based on a value of an "LIPF Support" attribute of a network slice type of the NS (as further discussed later in this document).

The method may further include providing a slice mediation and delivery function, sMDF, on the NS, the sMDF being configured to collect the LI data intercepted on the NS and to transmit the LI data outside the NS. The NS being configured to execute the sMDF may be determined based on a value of an "SMDF Support" attribute corresponding to the NS.

Figure 9:
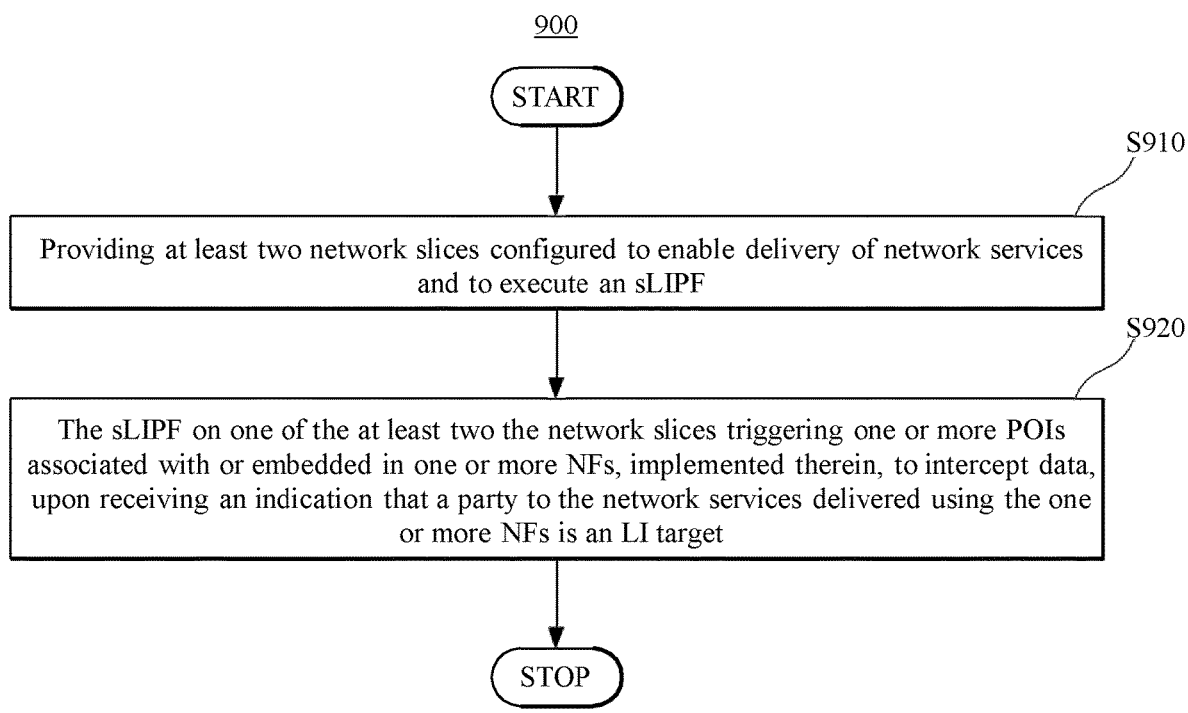
FIG. 9 is a flowchart of a method for providing LI in a radio communication system with NSs, according to another embodiment.

FIG. 9 illustrates a method 900 for providing an LI ability in a radio communication system (e.g., 500, 700), according to an embodiment. Method 900 includes providing NSs (e.g., 520, 530, 540 or 720, 730, 740) configured to deliver network services by executing NFs, at least one of NS being also configured to execute an sLIPF (e.g., 528, 538, 548, 728, 738, 748). Method 900 further includes, activating one or more POIs (such as 522*p*, 524*p*, 526*p*, 532*p*, 534*p*, 536*p*, 542*p*, 544*p*, 546*p*, 722*p*, 724*p*, 726*p*, 732*p*, 734*p*, 736*p*, 742*p*, 744*p*, 746*p*) associated with or embedded in one or more of the NFs (e.g., 522, 524, 526, 532, 534, 536, 542, 544, 546, 722, 724, 726, 732, 734, 736, 742, 744, 746) on the at least one of the NSs to intercept data, upon receiving target identity information of the LI target by the sLIPF.

The method may further include directing the POI(s) to transmit intercepted LI data to a slice mediation and delivery function, sMDF, on the same (at least one) NS, the sMDF being configured to transmit the LI data outside the NS. Here againg, the NS being configured to execute the sMDF is determined based on a value of an "SMDF Support" attribute of a network slice type corresponding to the NS.

Figure 10:
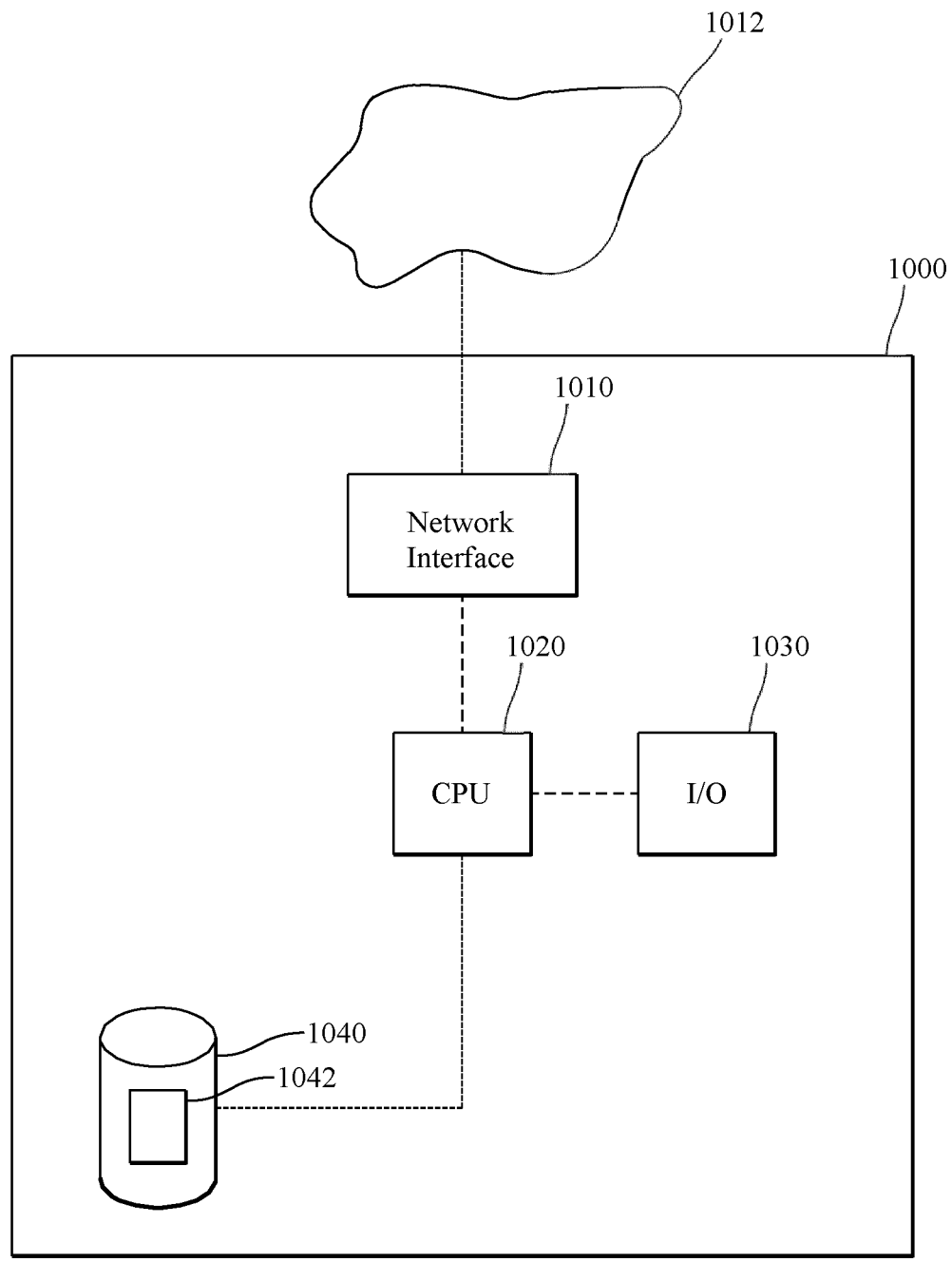
FIG. 10 is a schematic representation of a network device operating as a broker lawful interception provisioning function according to an embodiment.

FIG. 10 is a schematic representation of a network device 1000 operating as a bLIPF (e.g., 508, 708 in FIGS. 5 and 7, respectively) according to an embodiment. Network device 1000 has a network interface 1010 and a data processing unit 1020 that cooperate to perform as a bLIPF, that is: (A) to receive lawful interception target information related to a network service provided using a NF implemented on an NS, and (B) to forward the lawful interception target identity information to a sLIPFon the NS, the sLIPF activating a POI associated with or embedded in the NF to intercept lawful interception data.

The network device may also include a memory 1040 (with a computer readable storage medium 1042 able to non-transitorily store executable codes) and a user interface 1030. The network interface, the data processing unit and the memory may cooperate to perform also as a LICF that receives a warrant, extracts the lawful interception target information from the warrant, maintains a list of active network functions, provides the lawful interception target information and indicates the NT to the bLIPF. In other words, the network device 1000 would then corresponds to ADMF 505, 705 in FIGS. 5 and 7, respectively.

Figure 11:
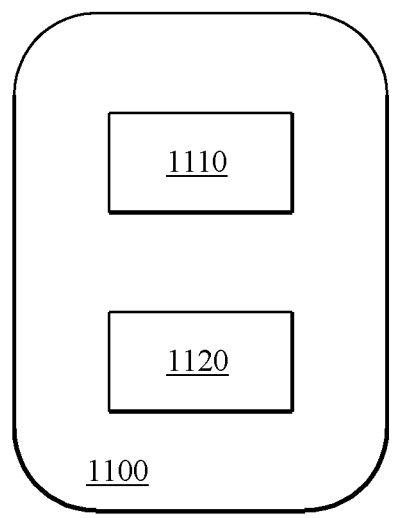
FIGS. 11, is a block diagram of a network device operating as a broker lawful interception provisioning function according to an embodiment.

FIG. 11 is a block diagram of a network device 1100 operating as a broker lawful interception provisioning function according to another embodiment. Network device 1100 includes a receiver module 1110 that receives lawful interception target information related to a network service provided using a NF implemented on an NS, and a transmitter module 1120 that forwards the lawful interception target information to a sLIPF on the NS. The sLIPF then activates a POI associated with or embedded in the NF to intercept data.

The above-described methods, network devices and radio communication systems using bLIPF and sLIPF provide the advantage of fewer interfaces (a single interface per network slice) for providing LI target information to activate POIs, and therefore a simplified LI implementation when network slices are used. Optionally, the mediation and deliver function may also be implemented on the network slice to collect LI data from all POIs of NFs on a NS thereby further lowering the number of interfaces between NS and the outside thereof.

Figure 12:
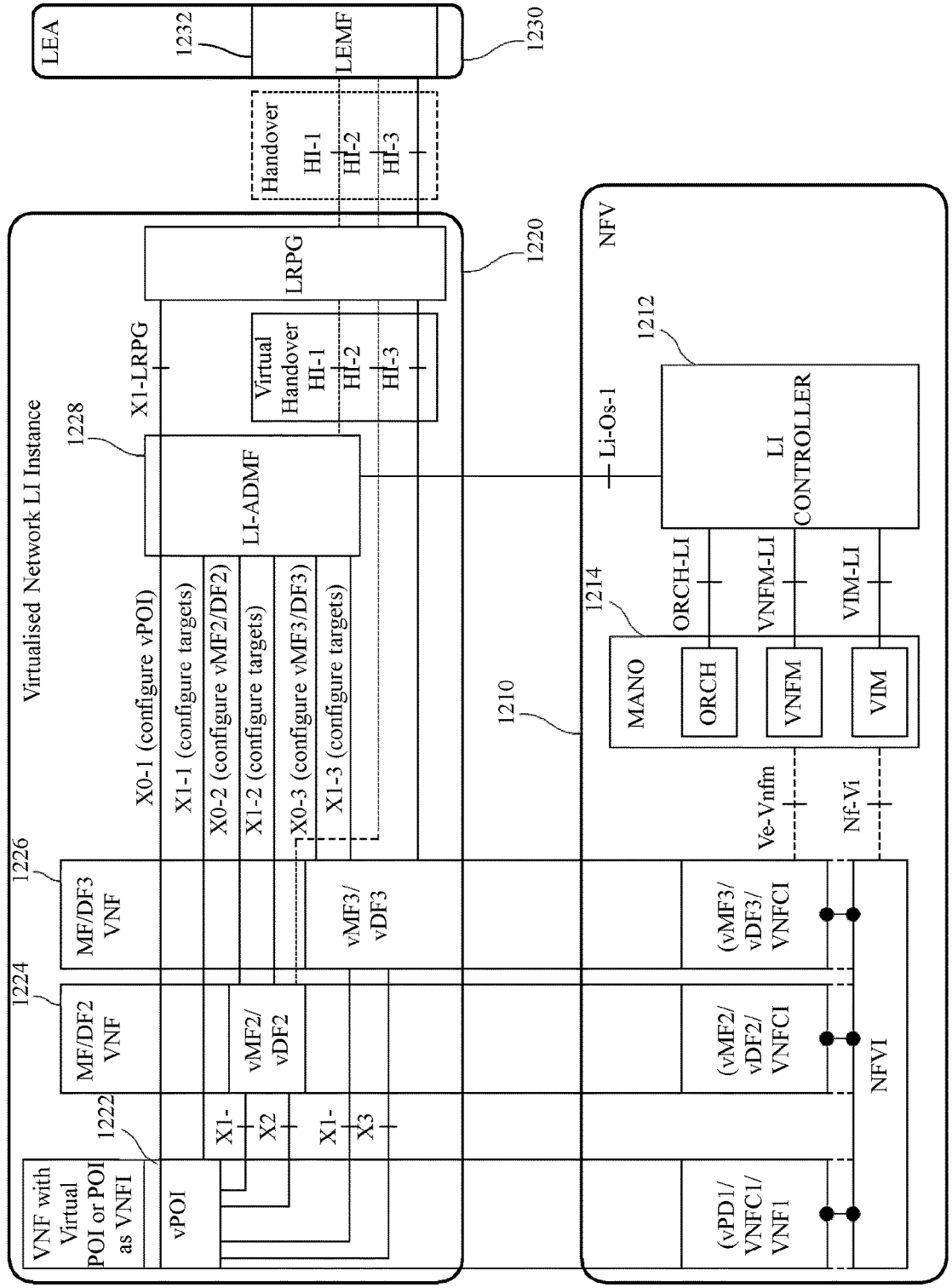
FIG. 12 illustrates a virtualized LI reference architecture.

Implementing LI functionality in the context of virtualization and cloud operation is described in the reference document ETSI GR NFV-SEC 011 entitled "Network Functions Virtualisation (NFV); Security; Report on NFV LI Architecture" of April 2018. FIG. 12 (which corresponds to FIGS. 5.3-1 in this reference document) illustrates a virtualized LI reference architecture with a network function virtualization (NFV) module 1210 generating a virtualized network instance 1220 (i.e., 3GPP-like functions in virtualized network service domain) able to deliver LI data to LEA device 1230 (i.e., to a law enforcement monitoring function, LEMF, 1232, via handover interfaces HI-1, HI-2 and HI-3). LI controller 1212, which is responsible for overall configuration and audit of the LI functionality, has NFV-level interactions with management and orchestration (MANO) 1214 for instantiating LI functions: virtual point of interception (vPOI) 1222 and virtual mediation and delivery functions 1224 and 1226 (vMDFs) that have strict security access/visibility requirements. LI administration function 1228 (LI-ADMF) configures the vPOI and vMDFs and communicates the LI target(s).

Figure 13:
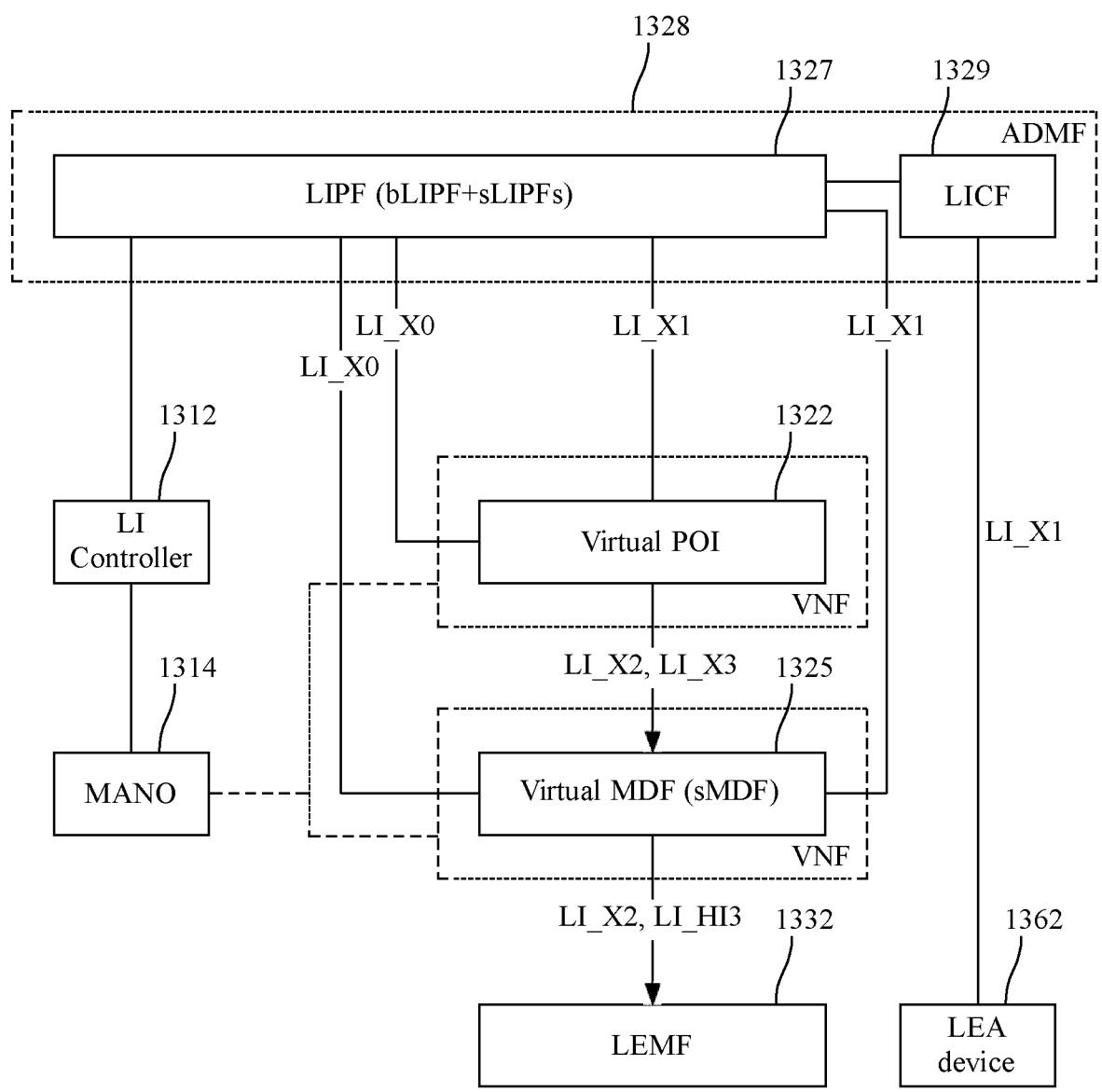
FIG. 13 represents a basic logical architecture of LI function in 5G networks.

A basic logical architecture of LI function in 5G networks is illustrated in FIG. 13. The procedures for NFs' deployment assume that LIPF 1327 (e.g., bLIPF+sLIPFs), LICF 1329 and LI controller 1312 already exist. The OSS/BSS (not shown) notifies MANO 1314 when a virtual NF (VNF) needs to be instantiated. To ensure that all LI related aspects are considered, MANO 1314 notifies LI NFV controller 1312 about the VNF instantiation. In case the VNF about to be instantiated is expected to have LI-specific functionalities such as POI and MDF, the LI controller notifies LIPF 1327 about LI-specific functionalities within the VNF. LIPF 1327 forwards that notification to LICF 1329 which, in turn, validates/verifies/authorizes POI and/or MDF for LI and orders LIPF for POI configuration that is performed over LI_X0. Even if the VNF does not need LI functionality, the LI controller may still notify the LIPF/LICF. Once, this validation/verification/authorization/configuration is completed, LIPF 1327 notifies LI controller 1312 that the LI-specific functions are authorized/verified, and then LI controller 1312 notifies MANO 1314.

As already mentioned, the NSs are parallel, virtualized and mutually isolated although they may share a common distributed cloud infrastructure. Each NS is a separate logical network that provides specific network capabilities and network characteristics and has its own associated resources (e.g., computing, storage and networking resources). The creation of a slice (also called "deployment") can be triggered by a network provider, third parties (tenants), and, in some cases, also by network subscribers.

GST-LI with LI-related attributes characterize a network slice from an LI point of view (i.e., LI aspects not covered by any GST described in the cited documents). However, some aspects have already been described in the above-mentioned PCT/EP2020/072806 by the same authors. The following embodiments provide for automatically deploying NSs ready from an LI point of view, and dedicated GST-LI and NEST-LI securely stored and separately handled.

Since GST is a contract between the NSP and the NSC (which may be network operators or specialized companies), the GST-LI and/or NEST-LI can be validated before NS's deployment by regulatory entities (agencies, governments, etc.). LI regulatory validation may occur before network slice deployment, which is described in Official Document NG. 116 "Generic Network Slice Template". In this context, using network virtualization and network slicing yields a flexible allocation of LI functionalities in network slices, depending on service type, and a flexible resources allocation for MDFs in network slices (network capabilities are used when needed and where needed). The LI resources being allocated when the network slice is deployed decreases network operation cost.

A GST-LI includes attributes usable to characterize LI functions and nodes needed in a type of network slice for efficiently implementing LI for NF run on the slice. An LI Network Slice Type (NEST-LI) is a GST-LI in which attributes have assigned values to fulfil a given set of requirements (including LI-related requirements) derived from a network slice customer use case. The NEST-LI is used to generate an NSI by an NSP. Similar with any NEST, the NEST-LI (that includes values of mandatory attributes other than the ones related to the LI-requirements) may be used as a reference by vendors, operators, providers, customers and also legal agencies that can thus determine whether a network slice fulfills an intended set of requirements (including LI-related ones). An NSC may indicate values or ranges for at least some of the GST-LI's attributes (both LI and non-LI-related attributes) depending on the intended use of the network slice (i.e., the use case). The NEST-LI template helps the network operators to select the appropriate network slice among existing (deployed) network slices or to cause a network slice instance to be created as needed.

Figure 14:
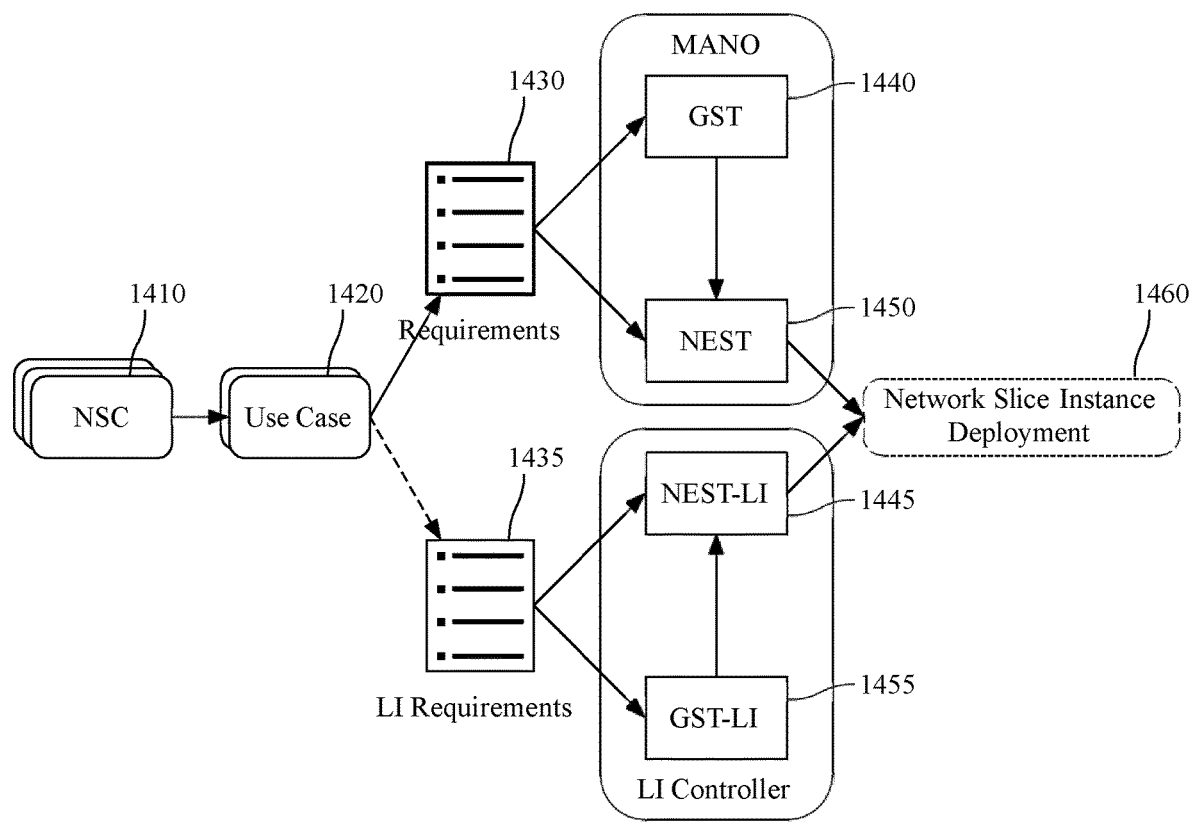
FIG. 14 illustrates GST-LI and NEST-LI in the context of a network slice lifecycle.

FIG. 14 illustrates GST-LI and NEST-LI in the context of a network slice lifecycle. First, NSC 1410 sets forth network service requirements 1430 and LI requirements 1435 for use case 1420. NSP (not shown) maps these service requirements into the attributes of both GST 1440 and GST-LI 1445 with the appropriate values, then generating NEST 1450 corresponding to the GST if no LI is appropriate, and NEST-LI 1455 corresponding to the GST-LI if LI usage is possible. Templates NEST 1450 or NEST-LI 1455 are then used to deploy an NSI fulfilling all requirements for use case 1420, at 1460.

GST-LI and NEST-LI contain sensitive information from a security point of view; therefore, they are preferably stored separately from GST and NEST. In FIG. 14, GST and NEST information is stored in MANO, while GST-LI and NEST-LI are stored in the LI controller. The LI controller performs a security controller role, and the interfaces between LI controller and MANO share the basis protocols ORCH-LI/VNFM-LI/VIM-LI (see the interfaces in FIG. 14). Note that the LI NFV functions and interfaces have more stringent security separation, visibility and access requirements than other NFs. In spite of the same basic architecture elements, network slices having NEST-LI type achieve distinct, extended capabilities.

Similar with the non-LI GST (described, for example, in 3GPP TS 28.530 entitled "Aspects; Management and orchestration; Concepts, use cases and requirements," v16.2.0 (2020 July) and 3GPP TS 28.531 entitled "Management and Orchestration; Provisioning" version 16.3.0 (2019 September)), GST-LI have attributes, categories and tagging and convey resource information, management information and capability information. GST-LI attributed have a defined presence being mandatory if the attribute's value must be present, conditional if the attribute's value is present and certain conditions are met, or optional if the attribute's value does not have to be present.

The attributes may be character attributes or scalability attributes. Character attributes characterize a slice from an LI perspective (e.g., throughput, latency, Application Program Interfaces (APIs), etc.) and are independent of the NSC and the NSP. Scalability attributes provide information about scalability of the network slice (e.g., number of terminals) and are specific for the NSC and the NSP. Different use cases and network slice design may yield some attributes being a character or a scalability attribute (e.g., area of service), but never both.

Character attributes can be tagged. The tags attached to the attributes provide additional information about the attribute. More than one tag may be attached to a character attribute.

Performance-related tags specify key performance indicators (KPIs) supported by the network slice (e.g., throughput and latencies) from an LI perspective.

Function-related tags specify functionality provided by the network slice (e.g., provisioning function, mediation function, etc.).

Control and management-related tags specify methods provided to the NSC for controlling and managing the slice. Performance-related tags and function-related tags play a role before the slice is deployed, while the control and management-related tags are relevant after the slice is deployed.

Exposure attributes characterize NSC to slice interaction. For example, the API indicates that the NSC may use an application program interface to get access to a slice's capabilities.

The following descriptions of some LI-related attributes usable in various GST-LIs embodiments have also been included in the previous patent application. Attribute "LIPF Support" describes whether the network slice is configured to enable a slice-based LIPF. This attribute is a binary parameter, for example, having value "0" if sLIPF is not supported, and "1" if sLIPF is supported. Attribute "MDF Support" describes whether the network slice is configured to enable a slice-based MDF. This attribute is also a binary parameter, having value "0" if MDF is not supported, and "1" if MDF is supported. In order to present the attributes in a manner consistent with the definition of other attributes in the standardized list of attributes, for each attribute is specified whether its value is associated with a measurement unit. Attribute "MDF Support" is not associated with any measurement unit and it is an optional character attribute. As previously discussed, a NEST-LI having this optional attribute set to 1 is stored in the LI controller. The "LIPF Support" and "MDF Support" attributes enable the NSC to comply with LI requirements before slice deployment by providing for an on-slice sLIPF and/or sMDF being created, thereby the network slice exposes a fewer interfaces for inputting and/or outputting LI-related information/data.

Attribute "LI Area of service" specifies where LI is enabled. The value is a string or series of strings; for example, names of one or more countries (e.g., Italy, France, Japan, U.K.). This attribute is not associated with any measurement unit, either, and it is also an optional character attribute.

A performance-related attribute is "IRI maximum delivery latency time," which specifies a maximum time interval between IRI interception and delivery to LI-MDF in the slice. The value of this attribute is a float point number (e.g., 300.0) representing the maximum time interval in milliseconds (i.e., ms is the measurement unit). This attribute is also a character attribute (operation scalability attribute KPI) and its presence is optional.

Another performance-related attribute is "Call Content delivery samples availability," which indicates whether loss of intercepted CC within the slice is tolerated. This is also a character attribute with optional presence. "Call Content delivery samples availability" attribute is a binary parameter (e.g., value "0" indicating that loss is tolerated and "1" that loss is not tolerated), not associated with any measurement unit.

Yet another performance-related attribute is "IRI maximum expected throughput," which specifies the maximum throughput expected for IRI. This attribute's value is an integer (e.g., 300), the associated measurement unit being IRI/sec. In this context, IRI is a complete set of information about a single traffic event, a kind of "information unit." "IRI maximum expected throughput" is a character attribute (operation scalability attribute KPI) and its presence is optional.

Similarly, "Call Content maximum expected throughput" is another performance-related attribute that specifies the maximum throughput expected for CC. Its value is an integer (e.g., 10) and its associated measurement unit is GByte/sec. This attribute is also a character attribute (operation scalability attribute KPI) and its presence is optional.

Without elaborating, other function-related attributes may indicate positioning support, service-based interception support, outband roamers support, X3/HI3 interface support, maximum sustainable throughput for a warrant activating LI in the slice.

Figure 15:
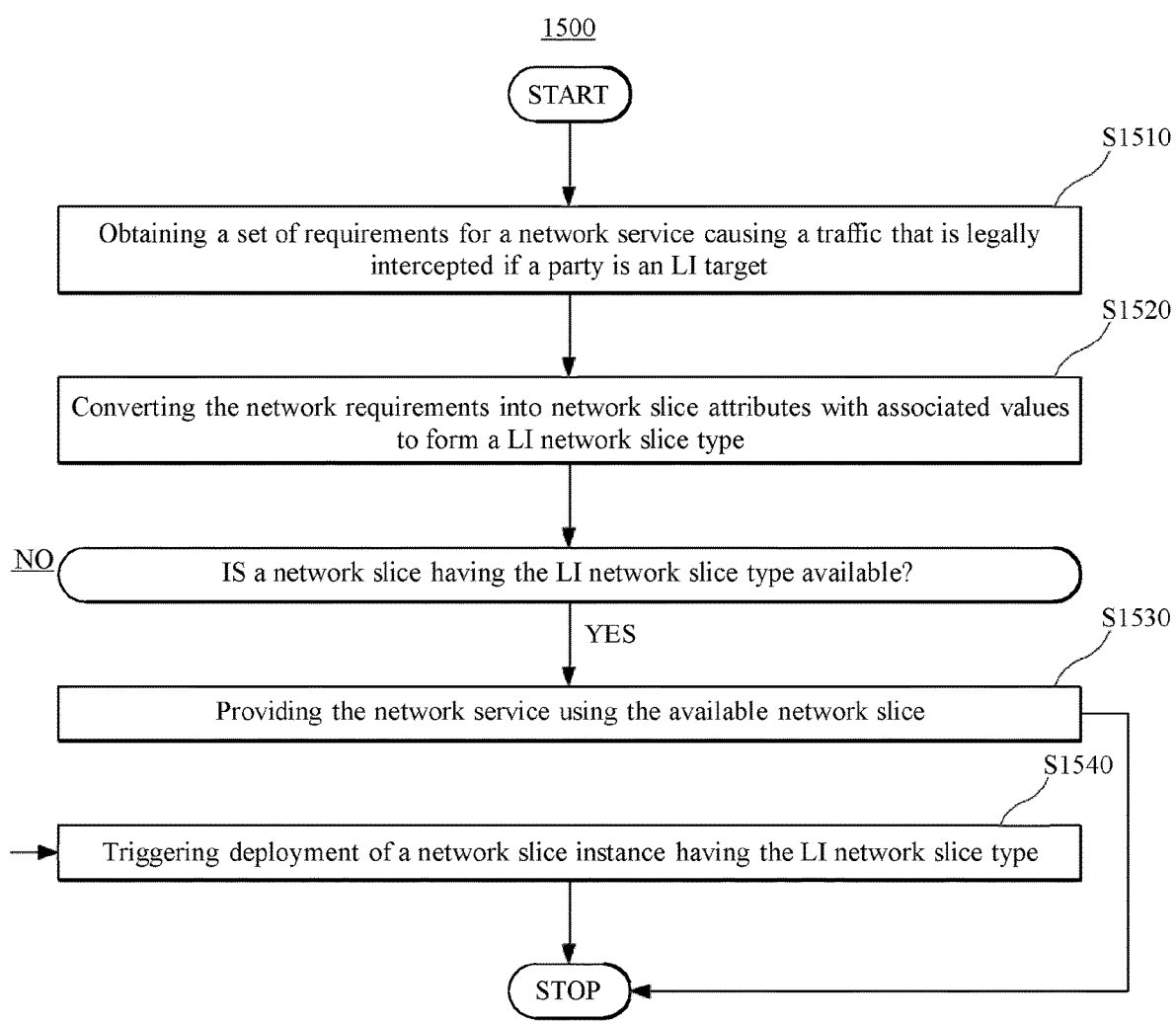
FIG. 15 is a flowchart of a method for providing a network slice with LI capabilities according to an embodiment.

In view of the above-described GST-LI, NEST-LI and additional LI-related attributes, FIG. 15 is a flowchart of a method 1500 for providing a network slice with LI capabilities. Method 1500 (which may be executed by a single network device) includes obtaining a set of requirements for a network service having traffic that is legally intercepted if a party is an LI target, at S1510. The method further includes converting the network requirements into network slice attributes with associated values to form an LI network slice type, at S1520. Here, at least one of the network slice attributes is an LI-related attribute. Any combination of the LI-related attributes may be included in this LI network slice type.

Then, if a network slice having the LI network slice type is available, providing the network service using the available network slice at S1530; otherwise, triggering deployment of a network slice instance having the LI network slice type at S1540.

In one embodiment, method 1500 may be executed by a network device with a structure similar to the one illustrated in FIG. 10. That is, the device's interface (e.g., 1010) is configured to obtain a set of requirements for a network service having traffic that may be legally intercepted if a party is an LI target. The device's data processing unit (e.g., 1020) is configured to convert the network requirements into network slice attributes with associated values to form an LI network slice type, at least one of the network slice attributes being an LI-related attribute. The device's data processing unit is also configured to provide information regarding a network slice having the LI network slice type to a network slice customer if such a network slice is available, and, if not available, to deploy a network slice instance having the LI network slice type.

The embodiments described in this section and variants thereof with sLIPF on a network slice and generating network slices configured to meet LI requirements improve LI implementation in radio communication networks, allowing regulatory validation to occur before network deployment, flexible and automated allocation of LI functionalities in network slices and of LI resources, and a tailor-made implementation of functionality in network slices according to specific needs instead of the conventional one-size-fits-all approach. These features yield operation and capital expenditures savings.

The disclosed embodiments provide methods and radio communication systems optimized to have fewer LI-related interfaces with network slices. It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 16:
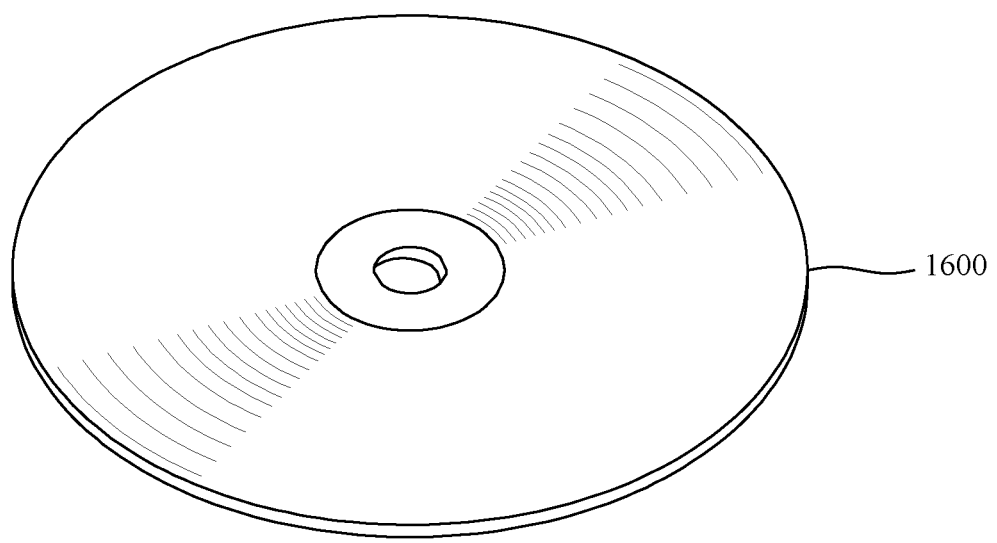
FIG. 16 illustrates an electronic storage medium on which computer program embodiments can be stored.

As also will be appreciated by one skilled in the art, the embodiments may take the form of an entirely hardware embodiment or an embodiment combining hardware and software aspects. Further, the embodiments, e.g., the configurations and other logic associated with the charging process to include embodiments described herein, such as, the methods associated with FIGS. 8, 9 and 15 may take the form of a computer program product stored on a computer-readable storage medium having computer-readable instructions embodied in the medium. For example, FIG. 16 depicts a computer readable storage medium 1600 on which computer program embodiments can be stored. Any suitable computer-readable storage medium may be utilized, including hard disks, CD-ROMs, digital versatile disc (DVD), optical storage devices, or magnetic storage devices such as floppy disk or magnetic tape. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

The invention claimed is:

1. A method for providing lawful interception, LI, in a radio communication system with network slices, NSs, the method comprising:
   providing a broker lawful interception provisioning function, bLIPF connected to a lawful interception centralized function, LICF, and to at least one slice lawful interception provisioning function, sLIPF, implemented on one of the NSs;
   receiving, from the LICF, by the bLIPF, an LI target identity according to a warrant, if the LICF determines that a party of a network service provided using a network function, NF, running on the one of the NSs has the LI target identity; and
   conveying the LI target identity from the bLIPF to the at least one sLIPF,
   wherein the at least one sLIPF activates a point of interception, POI, associated with or embedded in the NF to intercept data that is to be delivered outside the one of the NSs.

2. The method of claim 1, wherein the LICF also transmits an interception type according to the warrant, to the bLIPF, and the bLIPF then conveys the interception type to the at least one sLIPF.

3. The method of claim 1, further comprising:
   if the one of the NSs is also used to provide a second network service to the party, via a second network function,
   then the at least one sLIPF activates a second point of interception, associated with or embedded in the second network function to intercept the data.

4. The method of claim 1, further comprising:
   receiving, from the LICF, by the bLIPF, a second LI target identity according to a second warrant, if the LICF determines that a second party of a second network service provided using a second network function, running on the one of the NSs has the second LI target identity; and
   conveying the second LI target identity from the bLIPF to the at least one sLIPF,
   wherein the at least one sLIPF activates another POI associated with or embedded in the second NF to intercept the LI data.

5. The method of claim 1, wherein the one of the NSs being configured to execute the at least one sLIPF is determined based on a value of an "LIPF Support" attribute of a network slice type corresponding to the one of the NSs.

6. The method of claim 5, wherein the "LIPF Support" attribute is a binary parameter.

7. The method of claim 1, wherein the network system is a 5G system.

8. The method of claim 1, further comprising:
   providing a slice mediation and delivery function, sMDF, on the one of the NSs, wherein the sMDF is configured to collect the LI data intercepted on the one of the NSs and to transmit the LI data outside the one of the NSs.

9. The method of claim 8, wherein the one of the NSs being configured to execute the sMDF is determined based on a value of an "sMDF Support" attribute of a network slice type corresponding to the one of the NSs.

10. The method of claim 9, wherein the "sMDF Support" attribute is a binary parameter.

11. A method of providing lawful interception, LI, ability in a radio communication system, the method comprising:
    providing network slices, NSs, configured to deliver network services by executing network functions, NFs, at least one of the NSs being also configured to execute a slice lawful interception provision function, sLIPF,; and
    activating one or more points of interceptions, POIs, associated with or embedded in one or more of the NFs,, to intercept data, upon receiving target identity information of the LI target by the sLIPF.

12. The method of claim 11, further comprising:
    directing the one or more POIs to transmit intercepted LI data to a slice mediation and delivery function, sMDF, on one of the NSs, the sMDF being configured to transmit the LI data outside the one of the NSs.

13. A network device in a radio communication system with network slices, the network device having a network interface and a data processing unit that operate as a broker lawful interception provisioning function, bLIPF:
    to receive lawful interception target information related to a network service provided using a network function, NF, implemented on one of the network slices; and
    to forward the lawful interception target identity information to a slice lawful interception provisioning function, sLIPF, on the one of the network slices, the sLIPF activating a point of interception associated with or embedded in the NF to intercept data.

14. The network device of claim 13, further comprising a memory, wherein the network interface, the data processing unit and the memory operate to perform also as a lawful interception control function that receives a warrant, extracts the lawful interception target information from the warrant, maintains a list of active network functions, provides the lawful interception target information and indicates the NT to the bLIPF.

15. A computer readable recording medium non-transitorily storing executable codes that when executed by a computer make the computer perform a method for providing lawful interception, LI, in a radio communication system with network slices, NSs,, the method comprising:
    providing (S810) a broker lawful interception provisioning function, bLIPF be provided, the bLIPF being connected to a lawful interception centralized function, LICF, and to at least one slice lawful interception provisioning function, sLIPF, implemented on one of the NSs;
    receiving, from the LICF, by the bLIPF, an LI target identity according to a warrant, if the LICF determines that a party of a network service provided using a network function, NF, running on the one of the NSs has the LI target identity;
    conveying the LI target identity from the bLIPF to the at least one sLIPF,
    wherein the at least one sLIPF activates a point of interception, POI, associated with or embedded in the NF to intercept data that is to be delivered outside the one of the NSs.

* * * * *